Nov. 3, 1925.
A. H. JACKSON
ELECTRIC MOTOR CONTROL SYSTEM
Filed May 8, 1925   2 Sheets-Sheet 1
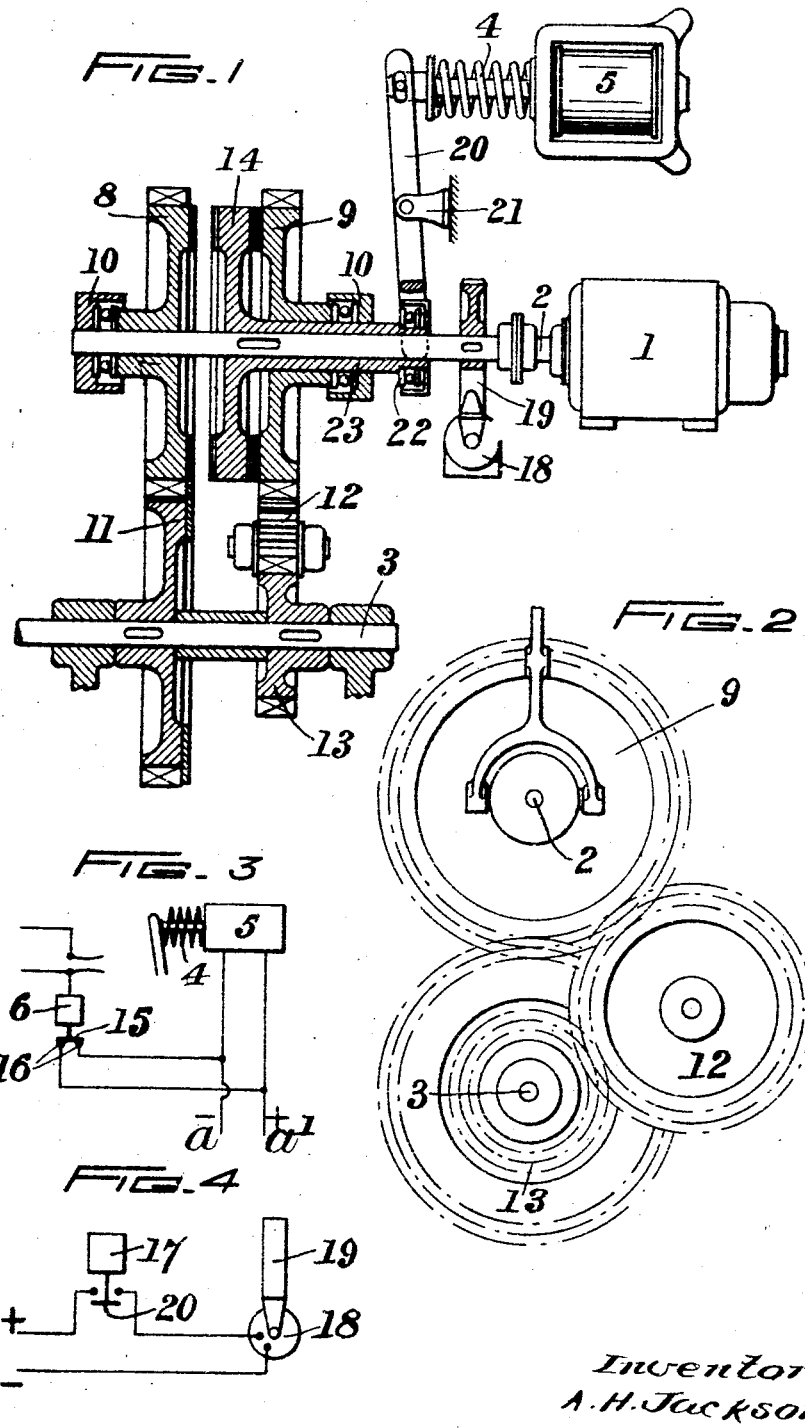
Inventor
A. H. Jackson

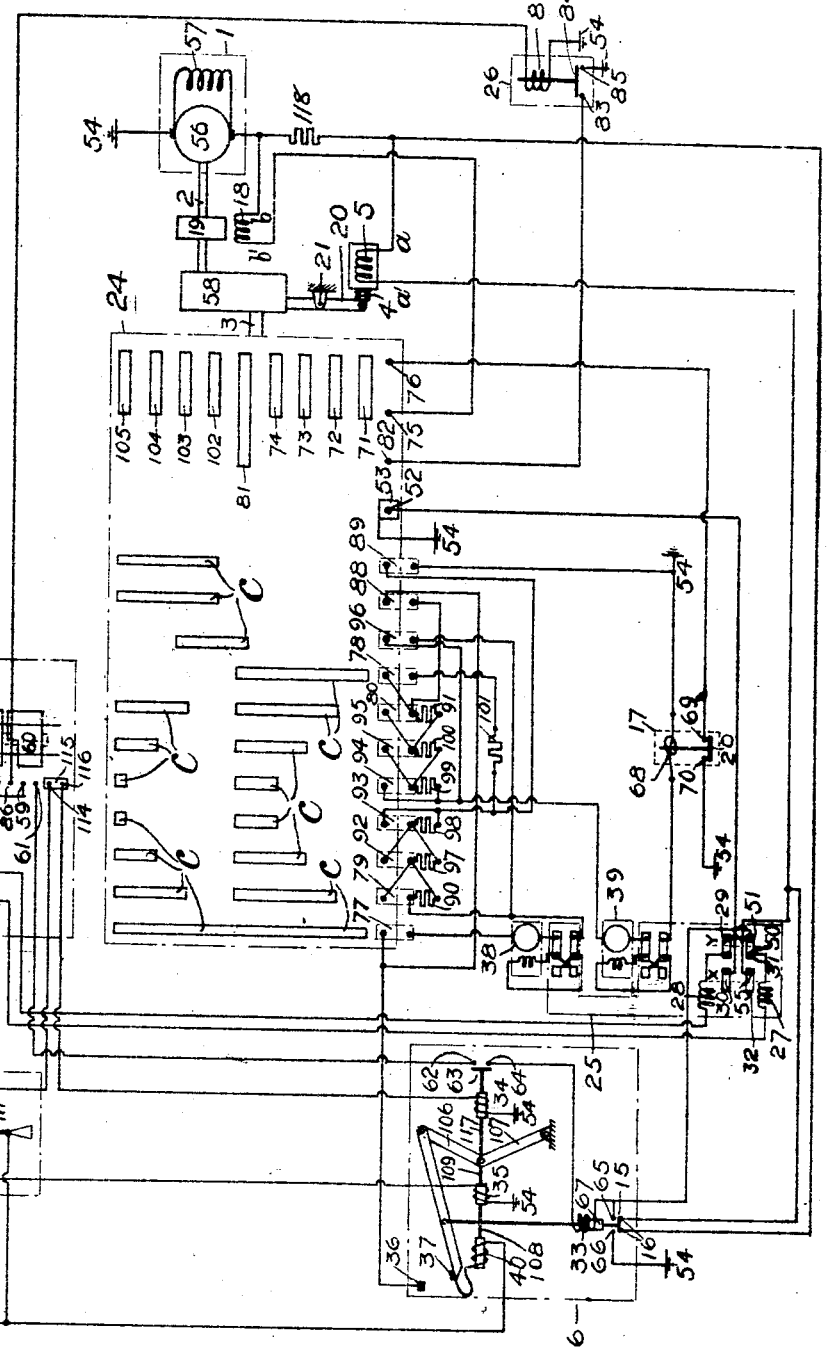

Patented Nov. 3, 1925.

1,560,382

UNITED STATES PATENT OFFICE.

ALBERT HENRY JACKSON, OF MUSWELL HILL, ENGLAND.

ELECTRIC-MOTOR-CONTROL SYSTEM.

Application filed May 8, 1925. Serial No. 28,906.

*To all whom it may concern:*

Be it known that I, ALBERT HENRY JACKSON, a British subject, residing at "Lamorna," 124 Muswell Hill Road, Muswell Hill, Middlesex, England, have invented certain new and useful Improvements in or relating to Electric-Motor-Control Systems, of which the following is a specification.

It has been proposed to make these motor control systems with clutches which are not reversible and in which the controller is returned by a spring and also in forms in which reversing is obtainable from unidirectional drive by hand-operated gear in which toothed wheels are employed and normally stand out of mesh, but my invention differs from the first of these constructions in that my control is reversible, and according to my invention the gear is friction driven and has the distinctive feature that it normally stands against reverse and is operated in accordance with the movements of an external electromagnetically operated contactor or line switch carrying the current to the main motor.

Briefly the invention consists in an apparatus for electric motor control having the combination with a master controller of an electromagnetically operated contactor or line switch for the main motor circuit, an auxiliary electric motor adapted to run always in one direction and operatively connected to main controller for progressively changing the conditions in the main motor circuit and means operatively connected with a member moving simultaneously with the line switch causing the uni-directional auxiliary motor to drive through friction members, which normally stand in reverse, the main controller in either direction, according to whether the line switch is open or closed.

According to the present invention means are provided for returning the main motor switch mechanism to its initial or "off" position when the line switch is opened so that it will be in a satisfactory position for starting the main motor after the line switch has been closed.

For this purpose a pilot motor, always rotating in the same direction, serves to drive reversing gear controlled by electromagnetic means so arranged that when the line switch is closed the main controller is moved forwards for starting the main motor, while when the line switch is opened the main motor switch mechanism is moved in the opposite direction. The reverse movement is preferably faster than the forward movement so as to minimize the time taken to perform a complete sequence of operations. An electromagnet serves to control clutch mechanism for effecting the forward or reverse movement of the main controller, the arrangement being such that when the line switch is closed the electromagnet is energized and actuates a clutch member for forward movement of the main controller, whilst when the line switch is opened the electromagnet is short circuited and a spring actuates the clutch member for reverse movement. The line switch carries an insulated contact adapted to bridge contacts for short circuiting the electromagnet when the line switch is opened and to break the short circuit when the line switch is closed. The clutch mechanism is preferably composed of an axially movable member for co-operation with two non-axially movable members geared to the main controller so as to drive it forwardly and rearwardly respectively, the axially movable member being normally held in engagement with the member for rearward movement by a spring and with the other member for forward movement by an electromagnet.

Means are also provided for stopping the forward movement of the main controller when the current in the main motor circuit reaches a predetermined limit and to allow it to continue when the current falls below this limit. In order to obtain this result a current limit relay has its actuating coil in the main motor circuit and actuates an electromagnetic brake when the current in the main motor circuit reaches a predetermined limit and releases the brake when the current again falls below this limit.

The invention will now be described with reference to the accompanying drawings, wherein:—

Fig. 1 shows a sectional view of mechanism for controlling the movement of the main controller.

Fig. 2 shows a side elevation of the gearing.

Fig. 3 shows the circuit diagram of the electromagnet controlling the actuation of the reversing gear.

Fig. 4 shows the circuit diagram for the electromagnetically operated brake.

Fig. 5 is a diagram of connections of a motor control system embodying my invention.

A small motor 1, hereinafter referred to as the pilot motor, is adapted to operate preferably a series of switches or contactors forming in part the main controller. These contactors, shown diagrammatically in Fig. 5, serve when actuated to vary the conditions obtaining in the main motor circuit, for example, by the insertion or withdrawal of resistance.

There is, as usual, preferably included in the circuit of the pilot motor, a resistance (118, Fig. 5) such that the pilot motor may be arrested with current on without harm resulting, and there is further provided to the main controller definite stops corresponding respectively to the initial or "off" position and the "full on" position so as to bring the main controller positively to rest when either of these positions is reached.

Between the driving shaft 2 of the pilot motor 1 and the operative member 3 of the main controller is disposed reversing gear (58, Fig. 5).

The gear shown comprises friction discs 8 and 9 having peripheral teeth and carried within thrust bearings 10 and connected through intermediate gearing 11, 12 and 13 respectively to the operative member 3 of the main controller. The arrangement of this gear is such that with uni-directional rotation of the pilot motor the disc 9 is adapted to drive the main motor switch mechanism in the reverse direction and the disc 8 drives it in the forward direction. Axially slidable on but rotating with the pilot motor shaft 2, or a shaft driven therefrom, is a friction disc 14 adapted to engage with and to drive by frictional grip either one or other of the two discs 8 and 9. The disc 14 is held normally by a spring 4 in contact with the disc 9 which is adapted to drive the main controller in the reverse direction. For this purpose the spring 4 acts on the end of a forked lever 20 pivotally mounted at 21 and having its forked end engaging a grooved collar 22. This collar is secured to the hub 23 of the disc 14, the hub 23 passing freely through the hub of the disc 9.

The end of the lever 20 is also connected to the core of an electromagnet 5 having its energizing coil connected in the circuit of supply between points $a$ and $a'$ (Fig. 3).

The moving member of the line switch 6 (Fig. 3) carries an insulated contact 15 which when the line switch is open is adapted to co-operate with stationary contacts 16 connected to opposite ends of the energizing coil of the electromagnet 5.

The operation of the apparatus as shown in Figs. 1 to 4 is substantially as follows:—

When the circuit of the pilot motor 1 is closed, and assuming the line switch 6 is open, the energizing coil of the electromagnet 5 is short circuited by the contact piece 15 bridging the stationary contacts 16 and is therefore inoperative. The spring 4 therefore holds the friction disc 14 against the disc 9 so that the main motor switch mechanism is retained in the initial position and the contactors are not actuated. If the line switch 6 is now closed the contact 15 is separated from the stationary contacts 16 thus removing the short circuit from the coil of the electromagnet 5. The coil is energized and through the medium of the lever 20, collar 22 and hub 23 moves the friction disc 14 into engagement with the disc 8 against the action of the spring 4. The pilot motor accordingly drives the main controller in forward progression and the contactors are successively operated forwardly.

When the circuit of the line switch is interrupted by the master controller the contact 15 comes into engagement with the contacts 16 thus short circuiting the energizing coil of the electromagnet 5, with the result that the electromagnet becomes inoperative and the spring 4 throws the friction disc 14 into engagement with the friction disc 9. As the friction disc 9 is geared to the operative member 3 of the main controller through the medium of the gear wheels 12 and 13, the member 3 will be driven in the opposite direction to that in which it was driven by the friction disc 8 and the gear wheel 11. Hence when the line switch is opened the main controller is driven in the reverse direction, i. e., towards the initial or "off" position by the pilot motor 1. By suitably choosing the proportioning of the friction disc 9 and gear wheels 12 and 13 it is possible for the speed of reversal of the main controller to be substantially increased over the speed of forward progression without changing the speed of the pilot motor 1. The advantages of such an arrangement are obvious in minimizing the time taken to perform a complete sequence of operations.

When the main controller is actuated in forward progression the current in the main motor circuit tends to increase by reason of the cutting out of resistance or other changes effected in that circuit by the actuation of the contactors. If the progression is unchecked the current in the main motor circuit may rise to an undesirably high amount. To ensure the stopping of the main controller at any predetermined limit of current a current limit relay 17 (Fig. 4) of well-known type, having its actuating coil connected in the circuit of the main motor, is adapted to control the operation of an electromagnet 18 acting upon a brake 19 which is preferably upon the pilot motor shaft 2, but if desired may be carried upon the reversing gearing or the operative member 3 of the main controller.

When the current in the main motor circuit reaches a predetermined limit said current limit relay 17 serves to close an auxiliary switch connecting the energizing coil of the electromagnet 18 in the circuit of supply between points $b$, $b'$ (Fig. 4), thus bringing the brake 19 into action and arresting the pilot motor shaft and consequently also the main controller. When the current in the main motor circuit falls the current limit relay 17 opens the auxiliary switch 20 and thus deenergizes the electromagnet 18 which accordingly releases brake 19 and the progression of the main motor switch mechanism is allowed to resume.

Should the current in the main motor circuit thereafter again rise to the predetermined limit this process is repeated, until finally the main controller reaches the final or "full on" position.

In order that the invention can be more readily understood I will describe it with relation to the diagram shown in Fig. 5 and in which my apparatus is embodied.

In this drawing 7 is a master controller, 24 is a main controller of the cam shaft type driven by pilot motor 1. The movement of the main controller is delimited in the initial and maximum positions by mechanical stops not shown.

25 is a solenoid operated reverser for reversing the main motors, 6 is an electromagnetically operated line switch, 17 is a maximum current relay and 26 is a paralleling relay.

$c$, $c$, $c$, $c$ represent diagrammatically the actuating cams of the main controller, which cams serve to close the mechanical contactors 77, 79, 92, 93, 94, 95, 80, 78, 96, 88, and 89.

Moving contact pieces 71, 72, 73, 74, 81, 102, 103, 104, 105 and 53 move with the main controller 24 and are adapted to engage with stationary contacts 76, 75, 82 and 52.

The energization of coil 27 or coil 28 disposes the motor reverser 25 into the appropriate position for forward or reverse drive of the main motors 38 and 39.

Moving contact pieces 29, 30, 31 and 32 move into one or other of the positions X or Y in accordance with the movement of the motor reverser 25.

18 is an electro-magnet actuating a mechanical brake 19 disposed on the pilot motor shaft 2 or intermediately between the said shaft and the operative member 3 of the main controller 24.

33 is the main actuating coil of the line switch 6. 34 and 35 are electro-magnet coils controlling the toggle members 106 and 107 of the line switch 6. The arrangement of said line switch is such that the contacts 36 and 37 leading to the main motors 38 and 39 are not closed, even though coil 33 be energized, unless toggle members 106 and 107 are set. Should the toggle members be unset either by the operation of overload coil 40 and link 108 or by the energization of trip coil 35 and link 109 then the circuit of the main motors is opened between contacts 36 and 37, even though the plunger 67 of the line switch is raised by the energization of coil 33.

110 is a two way switch for energizing either "set" coil 34 or "trip" coil 35 for the purpose of setting or unsetting the toggle members of the line switch.

The operation of the circuits is as follows:

The main and reverse handles 45 and 41 of the master controller 7 being in the off position, as shown, two way switch 110 is actuated to connect moving contact arm 111 to stationary contact 113.

A circuit is thus established from the source of supply at 46 through moving contact arm 111, stationary contact 113, stationary contact 114, moving contact piece 115 and stationary contact 116 of the master controller and the set coil 34 to the negative pole of supply, in this case the earth 54. Set coil 34 is thus energized and actuated link 117 to set the toggle members 106 and 107 and to bring moving contact piece 63 into connection with stationary contacts 62 and 64.

The reversing handle 41 of the master controller 7 being thrown now, for example, into forward position F, movable contact 42 of the master controller engages with fixed contacts 43 and 44, but no circuit is established until the main handle 45 of the master controller 7 is moved. Assuming this to be moved into position S a circuit is established from the source of supply at 46 through contacts 47, 48, 49, 43, 42 and 44 of the master controller to motor reverser coil 27. Should the motor reverser 25 be found set in position Y for reverse operation of the motors the moving contact piece 31 couples stationary contact 50 to stationary contact 51 and a circuit is completed through fixed contact 52 and moving contact 53 of the main controller 24 to the earth, 54. Coil 27 is accordingly energized and moves the motor reverser 25 into the appropriate position X for forward drive of the main motors. This connects stationary contact 50 to stationary contact 55 via the moving contact piece 32, breaking the previous circuit to earth but establishing a new circuit to earth via stationary contacts 16 and moving contact piece 15 of the line switch 6, resistance 118, and the armature 56 and field winding 57 of the pilot motor 1. The pilot motor is accordingly energized but the reversing gear 58 between it and the main controller 24 is held in reverse position because of coil 5 being short-circuited by stationary contacts 16, and moving contact piece 15 of the line switch 6. The pilot motor, therefore, at this moment retains the main controller in the "off" position against a mechanical stop not shown.

The movement of the main handle 45 of the master controller 7 into position S, however, establishes also a circuit from the source of supply at 46 through contacts 59, 60 and 61 of the master controller and 62, 63, and 64 of the interlock switch operatively connected to the line switch toggle members, the current passing through coil 33, stationary contact 52 and moving contact piece 53 of the main controller to earth. This energizes coil 33 and the line switch plunger 67 is actuated, closing the circuit to the main motors 38 and 39 through the agency of contacts 36 and 37. At the same time moving contact piece 15 is brought into connection with stationary contacts 65 and 66 so as to establish an alternative circuit to earth. The movement of contact piece 15 removes the short-circuit from coil 5 and the reversing gear 58 is now thrown for forward drive of the main controller by the consequent energization of coil 5. The main controller, therefore, commences to move in a forward direction, closing contactors 77 and 78 to start the main motors 38 and 39 in series connection.

The current now flowing through the main motors passes through coil 68 of the maximum current relay 17 and should the current reach a predetermined limit of strength this relay is actuated and the moving contact piece 20 connects contacts 69 and 70 so that when the main controller has reached a position such that either of moving contacts 71, 72, 73 and 74 are in connection with stationary contacts 75 and 76 a circuit is established through electromagnet 18 to earth, thus energizing electromagnet 18 and actuating the mechanical brake 19 which brings the main controller immediately to rest.

Upon the current in coil 68 decreasing the moving contact piece 20 drops and the main controller is allowed to resume forward progression, thus closing contactors 79 and 80 and cutting out resistance sections 90 and 91 from the main motor circuit. This again increases the current in coil 68 and the previously described procedure is repeated until the main controller reaches a position such that moving contact piece 81 bridges stationary contacts 82, 75 and 76. By this time contactors 92, 93, 94, 95 and 96 have also been closed by their respective cams and the remaining sections 97, 98, 99, 100, and 101, of resistance cut out of the circuit of the main motors. The main motors now have full potential imposed upon them and are coupled in series connection. At this stage current flows through brake coil 18, contacts 75, 81, 82, and 83, moving contact piece 84 and stationary contact 85 of the paralleling relay 26 to earth so that at this stage brake coil 18 is energized and the mechanical brake 19 brings the main controller to rest.

On now moving the main handle 45 of master controller 7 into position P a further circuit is established from the source of supply at 46, through contacts 59, 60 and 86 of the master controller and energizing coil 87 of the paralleling relay 26 to earth. Coil 87 is thus energized and lifts the moving contact piece 84 of the paralleling relay, thus opening the circuit of brake coil 18. Accordingly mechanical brake 19 releases and the main controller resumes its forward progression, closing contactors 88 and 89 which couple the main motors in parallel connection. Thereafter, forward progression of the main controller continues step by step under the control of maximum current relay 17, stationary contacts 75 and 76 and moving contact pieces 102, 103, 104, and 105 of the main controller in manner similar to that already described.

If at any time the current passing through the main motors reaches an excessive amount, coil 40, through links 108 and 109, operates to unset the toggle members 106 and 107 of the line switch 6. When this occurs moving contact piece 63 interrupts the circuit of energizing coil 33 of the line switch and the line switch opens, breaking the connection between contacts 36 and 37 and interrupting the circuit of the main motors. At the same time the moving contact piece drops and short-circuits coil 5 through the agency of stationary contact 16, thus throwing the reversing gear into reverse position and causing the pilot motor to return the main controller 24 to its initial or off position.

A like result may be produced at any time by the actuation of two way switch 110 into position such that moving contact arm 111 engages with stationary contact 112. In such event a circuit is established from the source of supply at 46 through moving contact arm 111, stationary contact 112 and trip coil 35 to earth, thus energizing trip coil 35, and by the agency of link 109 unsetting the toggle members 106 and 107 of the line switch.

What I claim is:

1. In an apparatus for electric motor control the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the uni-directional auxiliary motor to drive through friction members which normally stand in reverse, the switch mechanism in either direction according to whether the contactor is open or closed.

2. In an apparatus for electric motor the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the unidirectional auxiliary motor to drive the switch mechanism in reverse direction through friction members which normally stand in reverse, said reverse movement being effected faster than the forward movement in order to minimize the time occupied in performing a complete sequence of operations.

3. In an apparatus for electric motor control the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the unidirectional auxiliary motor to drive the switch mechanism in reverse direction through friction clutch mechanism controlled by an electromagnet the arrangement being such that when the line switch is closed the electromagnet is energized and actuates the clutch member for forward movement of the switch mechanism, whilst the line switch is opened the electromagnet is short circuited and a spring actuates the clutch member for reverse movement.

4. In an apparatus for electric motor control the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the unidirectional auxiliary motor to drive the switch mechanism in reverse direction through friction clutch mechanism controlled by an electromagnet wherein the line switch carries an insulated contact adapted to bridge contacts for short circuiting the electromagnet when the line switch is open, and to break the short circuit when the line switch is closed.

5. In an apparatus for electric motor control the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the unidirectional auxiliary motor to drive the switch mechanism and wherein an axially movable friction clutch member is disposed between a pair of non-axially movable members geared to the main motor switch mechanism so as to drive it forwardly and rearwardly respectively, the axially movable member being adapted to be normally held in engagement with the member for rearward drive by a spring and with the other member for forward movements by an electromagnet.

6. In an apparatus for electric motor control the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the unidirectional auxiliary motor to drive the switch mechanism in reverse direction through friction members which normally stand in reverse and wherein means is provided whereby the forward movement of main motor switch mechanism is stopped when the current in the main motor circuit reaches a predetermined limit and allowed to continue when the current again falls below this limit.

7. In an apparatus for electric motor control the combination with a master controller of an electromagnetically operated contactor or line switch for the main motor circuit, an auxiliary electric motor adapted to run always in one direction, and operatively connected to switch mechanism for progressively changing the conditions in the main motor circuit and means operatively connected with a member moving simultaneously with the contactor for causing the unidirectional auxiliary motor to drive the switch mechanism in reverse direction through friction members which normally stand in reverse and wherein means is provided whereby the forward movement of main motor switch mechanism is stopped when the current in the main motor circuit reaches a predetermined limit and allowed to continue when the current again falls below this limit, and wherein a current limit relay has its actuating coil in the main motor circuit and actuates an electromagnetically operated brake when the current in the main motor circuit reaches a predetermined limit and releases the brake when the current again falls below the predetermined limit.

In testimony whereof I affix my signature.

ALBERT HENRY JACKSON.